US012782787B2

(12) United States Patent
Clarke et al.

(10) Patent No.: US 12,782,787 B2
(45) Date of Patent: Nov. 3, 2026

(54) VEHICLE COMPRISING A COMBINED DISPLAY-LIGHTING UNIT

(71) Applicant: Bayerische Motoren Werke Aktiengesellschaft, Munich (DE)

(72) Inventors: Stella Clarke, Garching (DE); Martin Evert, Munich (DE); Andreas Knoedler-Bunte, Munich (DE); Dirk Mueller-Stolz, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 17 days.

(21) Appl. No.: 18/027,429

(22) PCT Filed: Dec. 9, 2021

(86) PCT No.: PCT/EP2021/085047
§ 371 (c)(1),
(2) Date: Mar. 21, 2023

(87) PCT Pub. No.: WO2022/128743
PCT Pub. Date: Jun. 23, 2022

(65) Prior Publication Data
US 2023/0331085 A1 Oct. 19, 2023

(30) Foreign Application Priority Data
Dec. 16, 2020 (DE) .................... 10 2020 133 843.0

(51) Int. Cl.
*G02F 1/165* (2019.01)
*B60K 35/22* (2024.01)
(Continued)

(52) U.S. Cl.
CPC .............. *G02F 1/165* (2019.01); *B60K 35/22* (2024.01); *B60K 35/28* (2024.01); *B60K 35/60* (2024.01);
(Continued)

(58) Field of Classification Search
CPC .... B60K 35/00; B60K 35/60; B60K 2360/33; B60K 2360/797; B60K 2360/1523;
(Continued)

(56) References Cited

U.S. PATENT DOCUMENTS 9,283,903 B2 3/2016 Albou et al.
11,230,225 B1 * 1/2022 Stefanov-Wagner ........................ B60Q 1/5037
(Continued)

FOREIGN PATENT DOCUMENTS

CN 111771334 A 10/2020
DE 10 2011 089 421 A1 6/2013
(Continued)

OTHER PUBLICATIONS

International Search Report (PCT/ISA/210) issued in PCT Application No. PCT/EP2021/085047 dated Mar. 14, 2022 with English translation (four (4) pages).
(Continued)

*Primary Examiner* — Tracy Y. Li
(74) *Attorney, Agent, or Firm* — Crowell & Moring LLP

(57) ABSTRACT

A vehicle includes a combined display-lighting unit. The combined display-lighting unit has, combined in a single component, an electronic paper display device forming an information zone and a lighting unit forming an illumination zone.

7 Claims, 5 Drawing Sheets

(51) Int. Cl.
*B60K 35/28* (2024.01)
*B60K 35/60* (2024.01)
*B60Q 1/00* (2006.01)

(52) U.S. Cl.
CPC ........ *B60Q 1/0023* (2013.01); *B60K 2360/33* (2024.01); *B60K 2360/797* (2024.01)

(58) Field of Classification Search
CPC .. B60K 2360/178; B60K 35/22; B60K 35/28; B60Q 1/0023; B60Q 1/5037; B60Q 1/543; B60Q 1/544; B60Q 1/545; B60Q 1/547; B60Q 2400/10; B60Q 1/0041; B60Q 1/2607; B60Q 1/503; B60Q 1/549; G02F 1/165
See application file for complete search history.

(56) References Cited

U.S. PATENT DOCUMENTS

| | | | | |
|---|---|---|---|---|
| 2013/0077153 | A1 | 3/2013 | Albou et al. | |
| 2014/0207338 | A1* | 7/2014 | Healey | G06F 7/00 701/1 |
| 2015/0032328 | A1 | 1/2015 | Healey et al. | |
| 2015/0283939 | A1* | 10/2015 | Parkes | B60Q 1/544 340/468 |
| 2015/0354772 | A1 | 12/2015 | Chen | |
| 2016/0178919 | A1* | 6/2016 | Sato | B60K 35/00 359/462 |
| 2017/0210285 | A1 | 7/2017 | Kobayashi et al. | |
| 2017/0305336 | A1 | 10/2017 | Parkes | |
| 2018/0005588 | A1* | 1/2018 | Kurokawa | B60K 35/00 |
| 2019/0001933 | A1* | 1/2019 | Dellock | G06F 3/03547 |
| 2019/0220179 | A1* | 7/2019 | Della Vecchia | B60R 13/0256 |
| 2019/0283686 | A1 | 9/2019 | Gussen et al. | |
| 2020/0369223 | A1* | 11/2020 | Hansen | B32B 9/02 |
| 2022/0206197 | A1* | 6/2022 | Tamura | G02B 5/208 |
| 2023/0001845 | A1* | 1/2023 | Takagi | B60Q 3/283 |

FOREIGN PATENT DOCUMENTS

| | | | |
|---|---|---|---|
| DE | 10 2013 021 819 | A1 | 6/2015 |
| DE | 10 2016 209 914 | A1 | 12/2017 |
| DE | 10 2018 203 857 | A1 | 9/2019 |
| DE | 10 2018 209 010 | A1 | 12/2019 |
| DE | 10 2019 203 307 | B3 | 1/2020 |
| DE | 10 2018 219 116 | A1 | 5/2020 |
| DE | 10 2018 221 711 | A1 | 6/2020 |
| EP | 2 952 386 | A1 | 12/2015 |
| GB | 2575736 | A | 1/2020 |
| WO | WO 2020/193135 | A1 | 10/2020 |

OTHER PUBLICATIONS

German-language Written Opinion (PCT/ISA/237) issued in PCT Application No. PCT/EP2021/085047 dated Mar. 14, 2022 (five (5) pages).
German-language Search Report issued in German Application No. 10 2020 133 843.0 dated Aug. 31, 2021 with partial English translation (11 pages).
English translation of Chinese-language Office Action issued in Chinese Application No. 202180066412.3 dated May 14, 2026 (7 pages).
English translation of Chinese-language Office Action issued in Chinese Application No. 202180066412.3 dated Feb. 2, 2026 (6 pages).

* cited by examiner

VEHICLE COMPRISING A COMBINED DISPLAY-LIGHTING UNIT

BACKGROUND AND SUMMARY OF THE INVENTION

The invention relates to a vehicle comprising a combined display-lighting unit. The invention relates in particular to such a motor vehicle.

A user interaction with a vehicle regularly begins as soon as the user is inside the vehicle. However, there is great potential in beginning the user experience before the user enters the vehicle, i.e. on the outside of the vehicle. External vehicle surfaces are potential communication regions that can be used for numerous new functional and emotional interactions.

In addition, automobile customers frequently have a desire to be able to individualize and customize the outside of vehicles. This has so far already been possible by way of individual vehicle paints and by individual permitted attachment parts, but such individual designs of a vehicle can be changed only with significant effort and in particular not situationally. For example, there may be a desire to adapt the appearance of the vehicle to a specific purpose of a particular journey, respectable and restrained when used as a wedding car or brightly colored for a surf vacation on the beach.

It is known from US 2015/0032328 A1 to provide display devices in or on a vehicle on which information relating to the identity of the occupants is displayed.

DE 10 2018 203 857 A1 discloses the provision of display devices in or on a vehicle on which maintenance notes relating to the vehicle are displayed.

It is the object of the present invention to design a vehicle in a manner such that it is possible without great effort to alter the outward appearance of the vehicle.

This object is achieved by the features of the claimed invention.

According to the latter, a vehicle, in particular a motor vehicle, is proposed, wherein the vehicle is characterized by a combined display-lighting unit which has, integrated in one component part, an e-paper display device forming an information region and a lighting unit forming an illumination region, in particular with a headlight and/or a rear lamp.

By using display elements operating on the principle of electronic ink (e-book principle), it becomes possible in a simple manner for an element arranged on the outside of the vehicle body to take on different colors and/or patterns. A desired design effect, for example white or colored accentuation of a decorative element in the region of the vehicle outer skin, can be achieved by way of the e-paper display device. The use of e-ink display elements has the advantage that electrical energy is required only when the display is set up and when it is changed, but not during the display. A front and rear vehicle region, or the front and back of a vehicle, regularly have two headlights and rear lamps, respectively, which fulfill safety-relevant functions, and a region between the headlights and rear lamps, respectively. Using the solution proposed, which provides a combined display-lighting unit, the headlights or rear lamps can continue to fulfill their safety-relevant functions, and the region between the headlights or rear lamps can moreover be used as a display surface for the design effects described above or for communication and/or information purposes.

The application scenarios described below can be implemented with this technical solution.

Future vehicles will exhibit a higher level of customizability. The presence of alterable display, color and light effects makes it possible to reflect updates and changes generally on the outside of the vehicle. For example, logos can be displayed in an alterable fashion.

It is also conceivable that vehicle status information is displayed. This can comprise information on the fact that the vehicle is in an autonomous driving state and/or information on a state of charge of a vehicle battery.

It is also conceivable that the vehicle is capable of taking on a character and/or specific behaviors, for example thanking another driver and/or vehicle after overtaking, displaying a friendly notice to another vehicle, displaying a request aimed at other road users (for example a message "Please cross the road, I will wait" at a marked crosswalk), and/or displaying a greeting for a passenger who wishes to enter the vehicle, possibly including practical information such as "navigation destination received," "desired temperature setting reached," and/or "wellness program ready."

It is also conceivable to display safety alerts for other road users, for example an alert relating to black ice on the road, an alert relating to dropped goods in an upcoming part of the road, and/or traffic alerts.

It is also conceivable to display recommendations, for example a banner for a restaurant that is located near the current location of the vehicle and currently has availability, and/or an event that takes place that evening.

It is also conceivable to adapt a display depending on the emotional state of the driver and/or of the passengers, similar to a profile post on social media.

Furthermore, conventional rear braking lights indicate a deceleration intensity or degree of brake pedal actuation by increasing their brightness. A new way of interpreting that is an increase in clarity or sharpness of a display as the deceleration intensity increases.

The invention is not limited to the application scenarios above, which merely serve to generally explain the core idea of the invention. Rather, the apparatus according to the invention can also realize within the scope of protection other application scenarios than the ones described above. The application scenarios can here have in particular features that represent a combination of the respective individual application scenarios described above.

Preferably, the e-paper display device extends over the information region and the illumination region.

The e-paper display device can serve in this case as a continuous main surface on a rear side of the display-lighting unit. In this way, information displayed by way of the e-paper display device can be displayed visibly to a user both in the information region and in the illumination region.

With further preference, the display-lighting unit has a cover layer that is arranged on a surface of the display-lighting unit facing a viewer of the display-lighting unit and extends over the information region and the illumination region.

With further preference, the cover layer is transparent, and/or is configured as a bistable layer and is transparent in a first of two states and opaque in a second of the two states.

It is conceivable to provide in particular a black, highly transparent masking layer as the cover layer in front of the lighting unit for what is known as a "hidden till lit" effect, and in particular in order to smooth out a gap between the e-paper and the lighting unit. The cover layer could also be transparent in the display region to obtain high contrast. The cover layer may become darker in the direction of the illumination region. The cover layer may also have different visual impressions, for example of brushed aluminum or a carbon-fiber look. When using the bistable layer, it is possible, for example by incrementally switching individual segments or pixels of the bistable layer, to achieve a variable masking intensity or transparency of the cover layer.

With further preference, the display-lighting unit has a foreground illumination device, which has LEDs arranged in particular laterally with respect to the e-paper display apparatus, for illuminating the information region and/or the illumination region.

The vehicle has, with further preference, a sensor, in particular a radar sensor, arranged behind the display-lighting unit, and the e-paper display device has recesses for the sensor.

With further preference, the lighting unit has an element or a plurality of elements arranged one above the other, each having a light source arranged behind a bistable layer, wherein the bistable layer is transparent in a first of at least two states and is opaque in a second of the at least two states. By providing a plurality of elements, depth effects can be created. If a single element is provided, sharpness or blur effects can be created, as is required in the final application scenario described above to indicate a braking intensity.

With further preference, the display-lighting unit is arranged on the outside on a front and/or a rear part of the vehicle body. In other words, the display-lighting unit can constitute a front and/or a rear light of the vehicle.

Preferred exemplary embodiments of the invention with additional design details and further advantages are described and explained in more detail below with reference to the appended drawings.

DETAILED DESCRIPTION OF THE DRAWINGS

Figure 1:
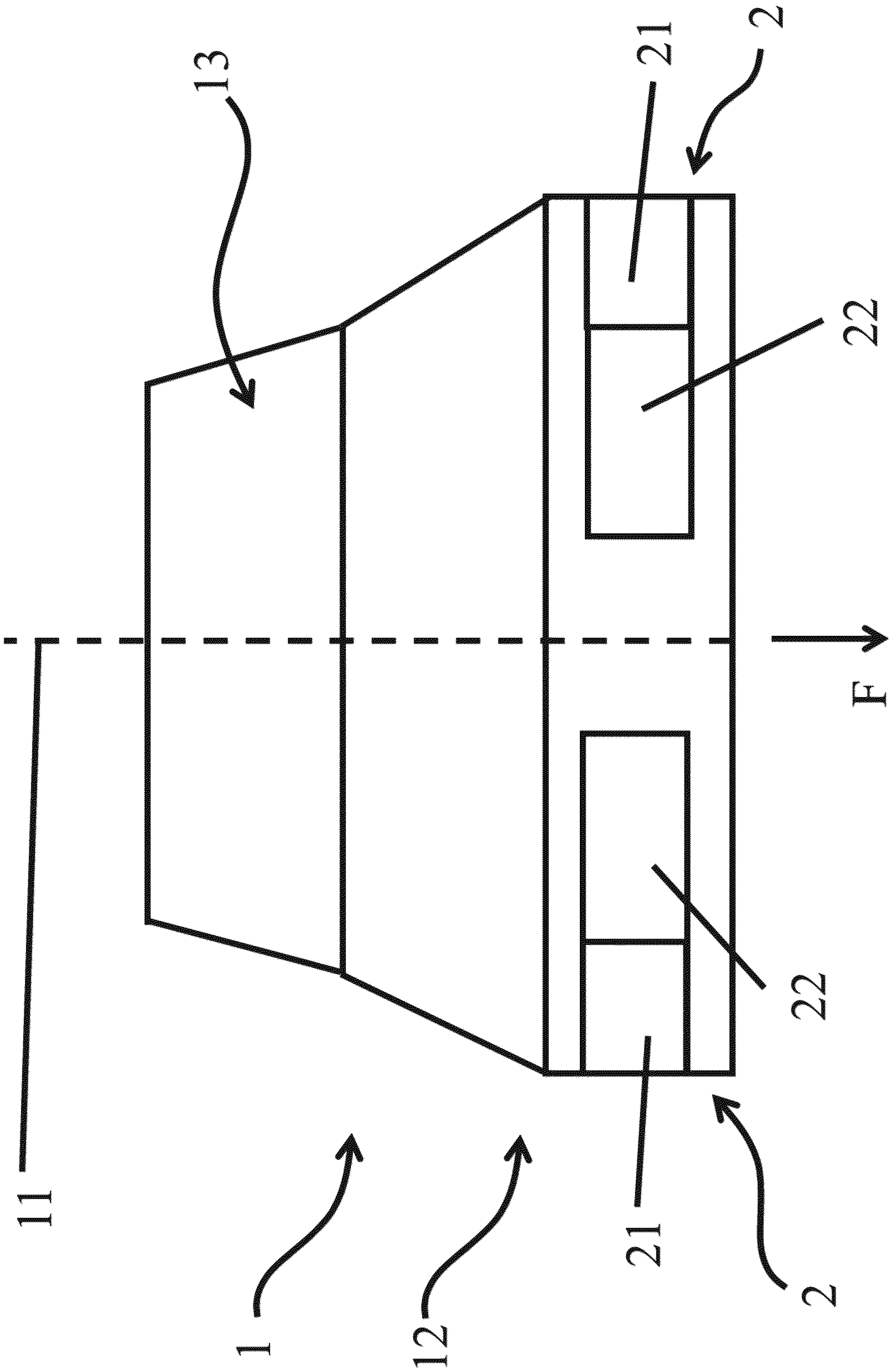
FIG. 1 shows a vehicle front with a combined display-lighting unit.
Figure 2:
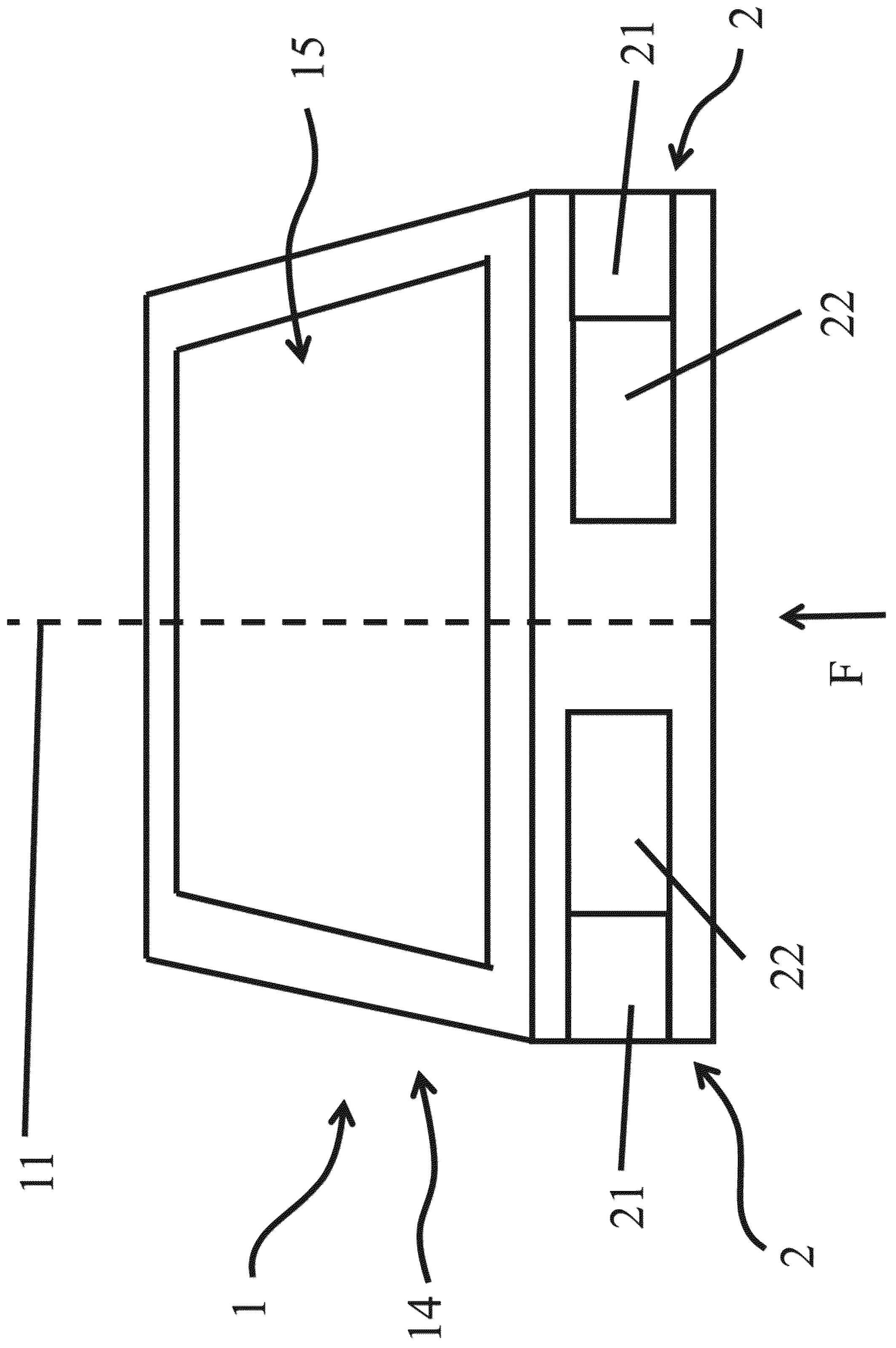
FIG. 2 shows a vehicle rear side with the combined display-lighting unit.
Figure 3:
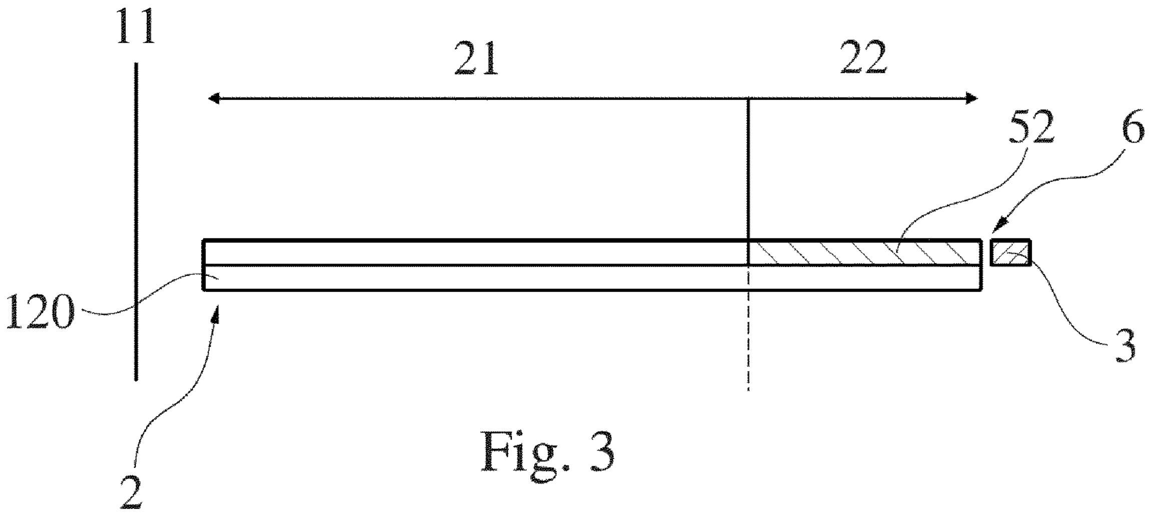
FIG. 3 shows a schematic illustration of the combined display-lighting unit from FIGS. 1 and 2 in a side view.
Figure 4:
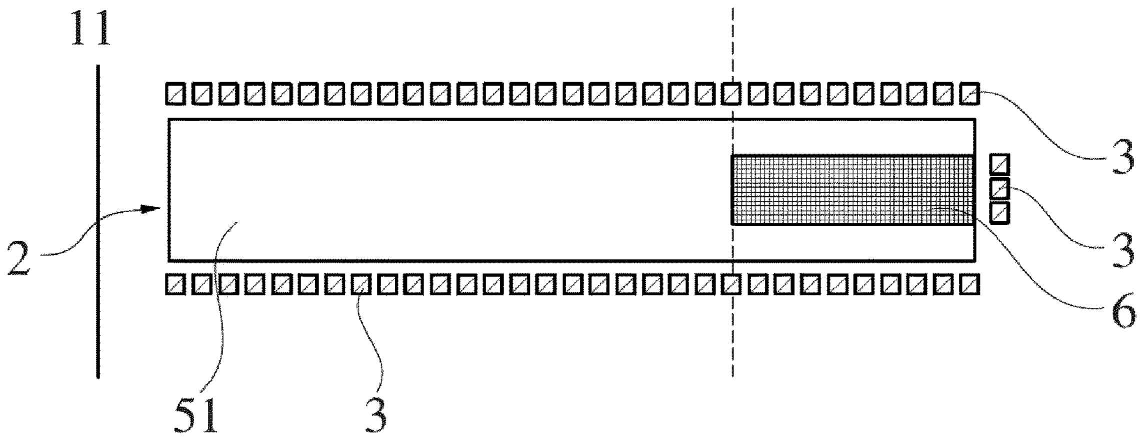
FIG. 4 shows a schematic illustration of the combined display-lighting unit from FIG. 3 in a top view.

FIG. 1 shows in a perspective view counter to a forward driving direction F a vehicle front 12 with a windshield 13 and a combined display-lighting unit 2. FIG. 2 shows in a perspective view along the forward driving direction F a vehicle rear side 14 with a rear window 15 and the combined display-lighting unit 2.

The setup and the mode of function of the display-lighting unit 2 are described with reference to FIGS. 3 to 7 using the example of the display-lighting unit 2 that is schematically illustrated there.

The combined display-lighting unit 2, which is arranged laterally with respect to (in FIGS. 3 to 7 to the right of) a vehicle center 11 (see also FIGS. 1 and 2), in the present case is configured to be one component part. In order to be able to implement both a display function for displaying contents and a safety-relevant illumination or lighting function with the component part, the latter has both an e-paper display device 120 forming an information region 21 and a lighting unit 6 forming an illumination region 22. The lighting unit 6 can be configured as a headlight at the vehicle front 12 and as a rear lamp at the vehicle rear or at the vehicle rear side 14.

As is evident in particular in FIGS. 3 to 7, the e-paper display device 120 extends over the information region 21 and the illumination region 22. The display-lighting unit 2 has a foreground illumination device 3 for illuminating the information region 21 and the illumination region 22. In the information region 21, which serves to display information, a scattering layer or light-guide device 51 for the e-paper display device 120 is arranged above the e-paper display device 120, which scattering layer or light-guide device 51 distributes the light, emitted by the foreground illumination device 3 arranged laterally with respect thereto (see FIG. 4), over a surface of the e-paper display device 120. In the illumination region 22, which serves at the vehicle front to illuminate the vicinity in front of the vehicle and at the vehicle rear side, among other things, to indicate a braking light, a scattering layer or light-guide device 52 is arranged laterally with respect to the foreground illumination device 3 (see FIG. 3), wherein the light-guide device 52 steers the light emitted by the foreground illumination device 3 arranged laterally with respect thereto into the vicinity in front of or behind the vehicle. It is conceivable in addition or alternatively to provide a background illumination device or a backlight.

Figure 5:
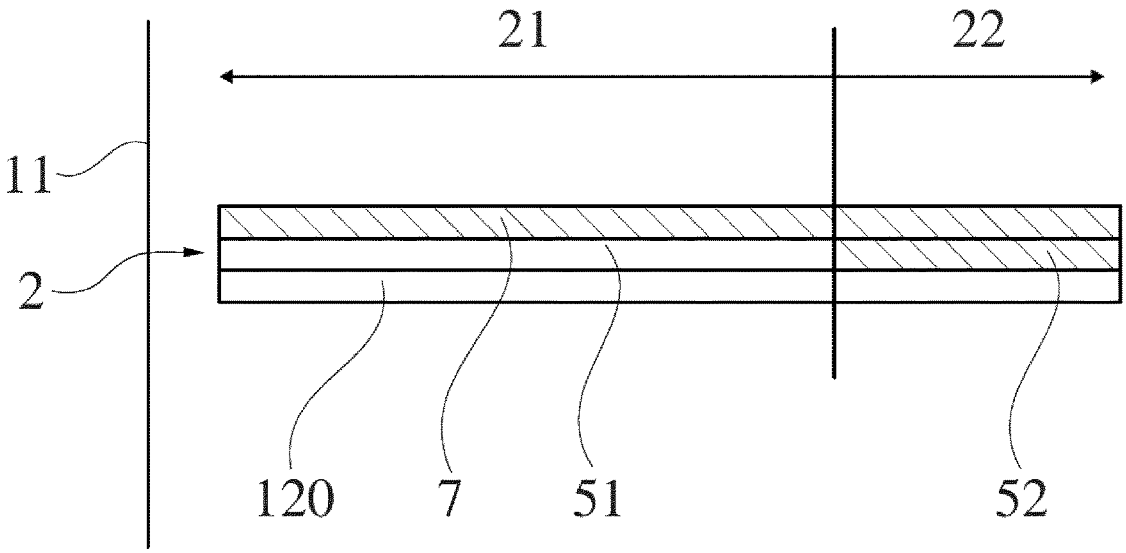
FIG. 5 shows a further schematic illustration of the combined display-lighting unit from FIGS. 1 and 2 in a side view.

As is evident in particular in FIG. 5, the display-lighting unit 2 can have in a preferred configuration a cover layer 7. The cover layer 7 is arranged on a surface of the display-lighting unit 2 facing a viewer of the display-lighting unit 2 and extends, analogously to the e-paper display apparatus 120, both over the information region 21 and over the illumination region 22. The cover layer can be used to realize, depending on the configuration thereof, different visual effects. In one configuration, the cover layer 7 can be statically transparent. It is also conceivable that the cover layer 7 in a further configuration has a bistable layer, in particular a further e-paper display apparatus, which contains exclusively pigments of one color, in particular black. In this configuration, the cover layer 7 can take on at least two states depending on the arrangement of the pigments, specifically the cover layer 7 can be transparent in a first of the at least two states and opaque in a second of the at least two states.

Figure 6:
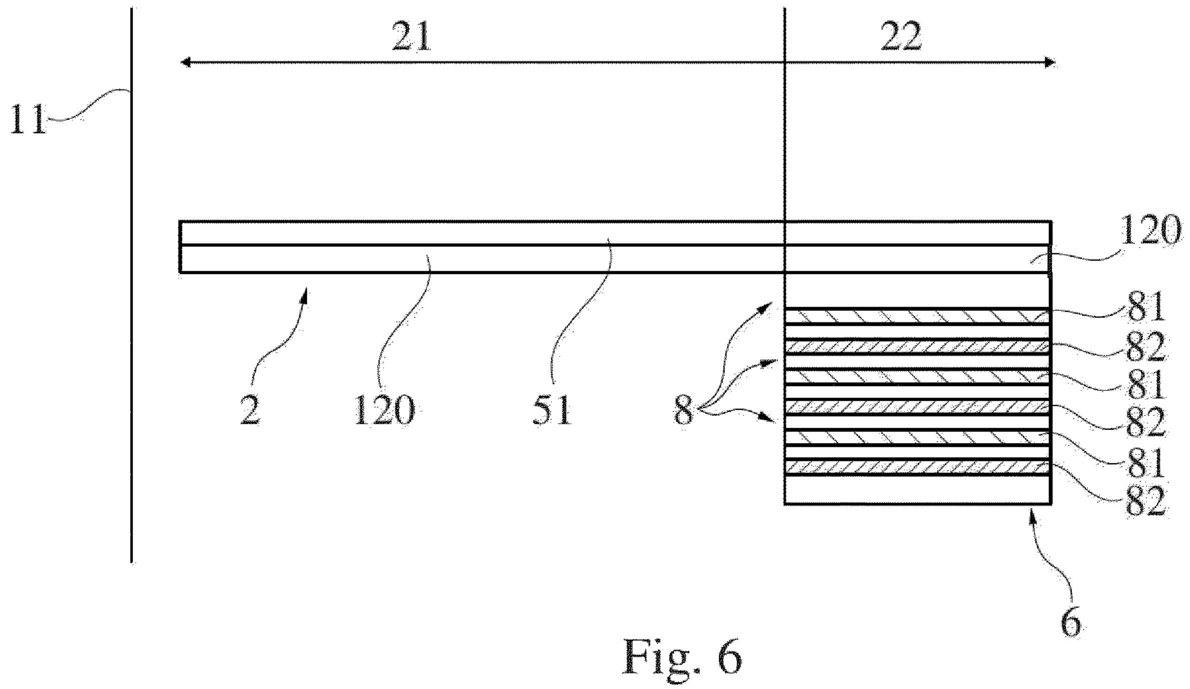
FIG. 6 shows a further schematic illustration of the combined display-lighting unit from FIGS. 1 and 2 in a side view.

As is evident in particular in FIG. 6, the display-lighting unit 2 can have in a preferred configuration an element or a plurality of elements 8 arranged one above the other, which form the lighting unit 6. The element or the plurality of elements 8 (three elements 8 in FIG. 6) each have a light source 82 arranged behind a bistable layer 81. The bistable layer 81 is configured, analogously to the above-described cover layer 7, to be transparent in a first of at least two states and opaque in a second of the at least two states.

By providing a plurality of elements 8, depth effects can be created. When a single element 8 is provided, sharpness and blur effects can be created, for example in order to signal an intensity of a brake pedal actuation by way of the display-lighting unit 2 arranged on the vehicle rear side. The e-paper display device 120 then has no pigments in the illumination region 22 and is consequently designed to be transparent.

Figure 7:
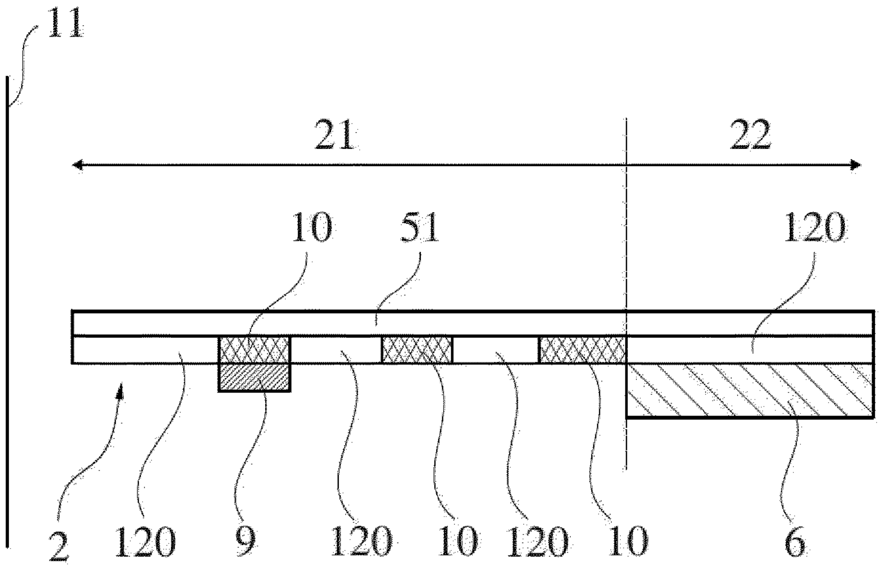
FIG. 7 shows a further schematic illustration of the combined display-lighting unit from FIGS. 1 and 2 in a side view.

As is evident in particular in FIG. 7, the vehicle can have a sensor 9, in particular a radar sensor, arranged behind the display-lighting unit 2, and the e-paper display device 120 can have a recess 10 for the sensor 9 that corresponds to the position of the sensor 9, with the result that the sensor can sense the vicinity in front of or behind the vehicle through the e-paper display apparatus 120. It is conceivable that a plurality of sensors 9 are provided (only one sensor 9 is illustrated in FIG. 7). In that case, one recess 10 can be provided separately for each sensor 9, as is indicated by way of example by the three recesses 10 in FIG. 7. It is furthermore conceivable that the recesses 10 have been painted, so that they are not easily, preferably not at all, visible to a viewer of the display-lighting unit 2.

It is furthermore conceivable that the lighting unit 6 is embodied as a conventional headlight or conventional rear lamp with at least one light source and with an optical unit, in particular including lenses, arranged in front of the light source. In this case, the e-paper display apparatus 120 is embodied to be transparent in the illumination region 22 (see FIG. 7).

Figure 8:
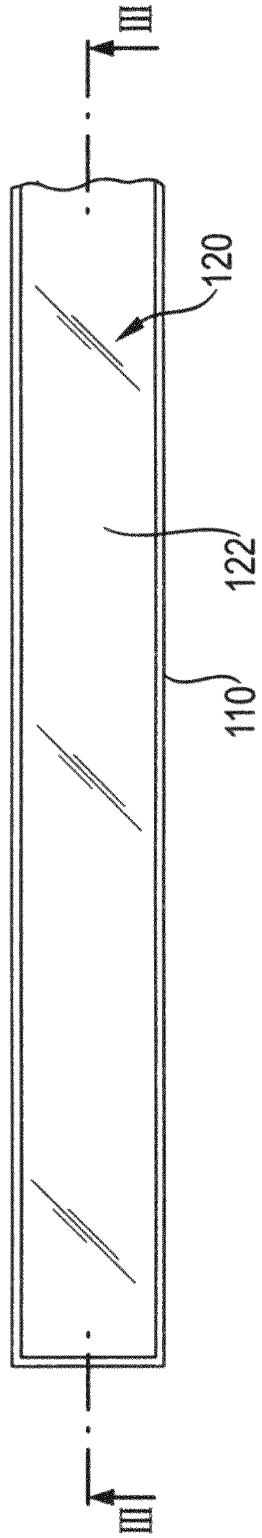
FIG. 8 shows a schematic illustration of an e-paper display apparatus of the combined display-lighting unit from FIGS. 1 to 7 in a top view.

The setup and the mode of function of the e-paper display device 120 from FIGS. 3 to 7 will be described below with reference to FIGS. 8 and 9 using the example of the e-paper display device 120 that is schematically illustrated there.

The e-paper display device 120 has a carrier body 110 and is provided with a transparent or translucent display window 122, behind which there are a plurality of display elements or pigments 124 in the form of microcapsules.

Figure 9:
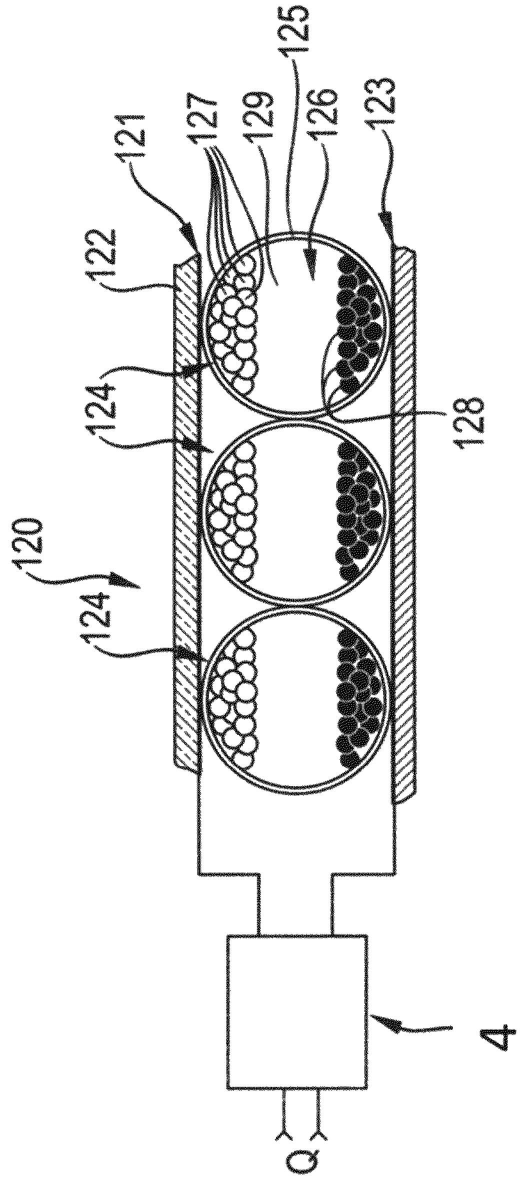
FIG. 9 shows a schematic cross section through the e-paper display apparatus in the direction of the arrows III-III in FIG. 8.

As is evident in FIG. 9, the display window 122 at the same time forms a first two-dimensional (upper) electrode 121. A second two-dimensional (lower) electrode 123 is provided on the rear side of the e-paper display device 120 behind the display elements 124. Each of the display elements 124 has a transparent housing wall 125, which encloses an interior space 126 of the display element 124. The interior space 126 contains a plurality of first pigments 127 of a first color (here white) and a plurality of second pigments 128 of a second color (here black), which are surrounded by a transparent fluid 129, wherein the black pigments 128 are typically charged positively and the white pigments 127 are typically charged negatively. When a positive or negative electrical field is activated by applying a voltage to the electrodes 121, 123, the black pigments 128 and the white pigments 127 move toward the respectively opposite electrodes 121, 123. The pigment particle amount that migrates to the upper, in particular transparent, electrode 121 is visible to the viewer as a black or white dot in the display window 122. Further developments of this shown e-paper display device 120 with a plurality of different display elements containing colored pigments instead of the white pigments 127 have the ability to display colors.

The light emitted by the above-described foreground illumination device 3 is distributed by the likewise above-described light-guide device 51 over the surface of the display window 122 and there illuminates the plurality of the display elements 124, which are formed by the microcapsules and whose upper pigments 127 consequently reflect the light to the outside through the display window 122. The e-paper display device 120 consequently is illuminated in the color of the upper pigments 127 (in white in the example shown).

The electrodes 121, 123 are electrically conductively connected to a control device 4 that is supplied with electrical energy by a power source Q. The control device 4 supplies the electrodes 121, 123 with an electrical switching signal with corresponding polarity in order to switch the display elements 124 from black to white, for example. If the e-paper display device 120 is capable of displaying different colors, the control device 4 is capable of controlling the display elements 124 in a manner such that the e-paper display device 120 displays a color that is desired by the user and/or specified in a different way.

The invention is not limited to the above exemplary embodiment, which serves merely to generally explain the core idea of the invention. Rather, the apparatus according to the invention can, within the scope of protection, also take on other embodiments than those described above. The apparatus can here in particular have features that represent a combination of the respective individual features of the claims.

Reference signs in the description and the drawings merely serve to provide a better understanding of the invention and are not intended to limit the scope of protection.

LIST OF REFERENCE SIGNS

1 Motor vehicle
11 Vehicle center
12 Vehicle front
13 Windshield
14 Vehicle rear side
15 Rear window
2 Display-lighting unit
3 Illumination device
4 Control device
51 Scattering layer or light-guide device for e-paper display device
52 Scattering layer or light-guide device for lighting unit
6 Lighting unit
7 Cover layer
8 Element
81 Bistable layer
82 Light source
9 Sensor
10 Recess for sensor
110 Carrier body
120 E-paper display device
121 First two-dimensional electrode
122 Display window
123 Second two-dimensional electrode
124 Display element
125 Housing wall
126 Interior space
127 First pigments
128 Second pigments
129 Transparent fluid
F Forward driving direction
Q Power source

The invention claimed is:

1. A vehicle comprising:

a combined display-lighting unit, wherein the combined display-lighting unit has, integrated in one component part, an e-paper display device forming an information region and a lighting unit forming an illumination region, wherein:

the e-paper display device extends over the information region and the illumination region, the display-lighting unit is arranged on an outside of the vehicle body, and the lighting unit is a headlight of the vehicle or a rear braking light of the vehicle, the display-lighting unit has a foreground illumination device for illuminating the information region and the illumination region, in the information region, a first scattering layer or a first light-guide device is arranged above the e-paper display device and laterally with respect to the foreground illumination device, and in the illumination region, a second scattering layer or a second light-guide device is arranged above the e-paper display device and laterally with respect to the foreground illumination device.

2. The vehicle according to claim 1, wherein the display-lighting unit has a cover layer that is arranged on a surface of the display-lighting unit facing a viewer of the display-lighting unit and extends over the information region and the illumination region.

3. The vehicle according to claim 2, wherein the cover layer is transparent, and/or is configured as a bistable layer and is transparent in a first of at least two states and opaque in a second of the at least two states.

4. The vehicle according to claim 1, further comprising:

a sensor arranged behind the display-lighting unit, wherein the e-paper display device has a recess for the sensor.

5. The vehicle according to claim 4, wherein the sensor is a radar sensor.

6. The vehicle according to claim 1, wherein:

the lighting unit has an element or a plurality of elements arranged one above the other, each having a light source arranged behind a bistable layer, and the bistable layer is transparent in a first of at least two states and is opaque in a second of the at least two states.

7. The vehicle according to claim 1, wherein the vehicle is a motor vehicle.

* * * * *